(12) United States Patent
Catania

(10) Patent No.: US 6,648,111 B2
(45) Date of Patent: Nov. 18, 2003

(54) POSITIVE ROTATING ANCHOR PIN

(75) Inventor: Michael Vito Catania, Clarskton, MI (US)

(73) Assignee: Meritor Heavy Vehicle Technology, LLC., Troy, MI (US)

( * ) Notice: Subject to any disclaimer, the term of this patent is extended or adjusted under 35 U.S.C. 154(b) by 0 days.

(21) Appl. No.: 10/010,367

(22) Filed: Dec. 6, 2001

(65) Prior Publication Data

US 2003/0106750 A1 Jun. 12, 2003

(51) Int. Cl.[7] .............................................. F16D 65/09
(52) U.S. Cl. .................................... 188/330; 188/206 A
(58) Field of Search ............................ 188/206 A, 325, 188/331, 332, 335, 338, 340, 341

(56) References Cited

U.S. PATENT DOCUMENTS 4,353,442 A * 10/1982 Correa ........................ 188/330
4,573,557 A * 3/1986 Shellhause .................. 188/216
4,679,667 A * 7/1987 Zawodni ..................... 188/341

* cited by examiner

Primary Examiner—Christopher P. Schwartz
(74) Attorney, Agent, or Firm—Carlson, Gaskey & Olds

(57) ABSTRACT

A brake assembly is provided having a brake spider with a hole. An anchor pin is supported within the hole and includes end portions extending from the spider. The end portion has a first interlocking profile, which may be a recess or flat in the outer cylindrical surface of the anchor pin. The cylindrical surface extends preferably to the terminal ends of the pin. That is, the anchor pin has a generally uniform diameter across its length excluding the areas in which the recess or flat is arranged. A brake shoe includes a web having an aperture. The end portion of the anchor pin is at least partially disposed within the aperture. The aperture has a second interlocking profile complimentary to and mating with the first interlocking profile of the anchor pin to prevent relative rotation between the web and the end portion. The brake shoe and anchor pin will rotate in unison about the pivot point defined by the anchor pin to ensure the pin does not bond to the spider.

12 Claims, 2 Drawing Sheets

POSITIVE ROTATING ANCHOR PIN

BACKGROUND OF THE INVENTION

This invention relates to a commercial vehicle brake assembly, and more particularly, the invention relates to an anchor pin for supporting the brake shoes of the brake assembly.

Heavy duty brake assemblies typically used on commercial vehicles commonly incorporate a pair of opposing arcuate brake shoes. The brake shoes may be actuated by an actuating member such as an S-cam manipulated by a pneumatic cylinder to force the brake shoes into an engagement with the interior surface of a brake drum. The ends of the brake shoe opposite the S-cam are supported on a brake spider by anchor pins. The pins define pivot points about which the shoes rotate. The anchor pins are received in holes in the spider and extend therefrom to support the brake shoe ends.

As the S-cam manipulates the brake shoes, the brake shoes rotate about the pivot point define by the anchor pin. It is desicreable for the achor pin to rotate with the hole in the spider so that the anchor pin does not bond to the spider as a result of corrosion. That is, it is believed that rotation of the anchor pin within the spider extends the life of the pins and reduces the service to the brake assembly. However, the rotation of the brake shoe about the anchor pin pivot does not always result in the anchor pin rotating within the spider, and the anchor pin frequently corrodes to the spider resulting in increased wear.

Anchor pins are typically designed for the worse case scenario throughout a manufacturer's brake assembly product line. Prior art brake assembly typically include a cylindrical central portion and a pair of opposing smaller diameter cylindrical end portions extending from either side of the central portion. The central portion is received within the-hole in the spider and the end portions extend beyond the spider to support the brake shoes. The central portion creates a shoulder by which the brake shoe retains the anchor pin within the spider. Since the anchor pins are designed for a worse case scenario, weight and cost is added to the brake assemblies due to the larger than necessary pins and spider. Therefore, what is needed is a smaller anchor pin that rotates within the spider hole in response to manipulation of the brakes shoes.

SUMMARY OF THE INVENTION AND ADVANTAGES

The present invention provides a brake spider with a hole. An anchor pin is supported within the hole and includes end portions extending from the spider. The end portion has a first interlocking profile, which may be a recess or flat in the outer cylindrical surface of the anchor pin. The cylindrical surface extends preferably to the terminal ends of the pin. That is, the anchor pin has a generally uniform diameter across its length excluding the areas in which the recess or flat is arranged. A brake shoe includes a web having an aperture. The end portion of the anchor pin is at least partially disposed within the aperture. The aperture has a second interlocking profile complimentary to and mating with the first interlocking profile of the anchor pin to prevent relative rotation between the web and the end portion. In this manner, the anchor pin will rotate within the hole of the spider in response to actuation of the brake shoes. Said in another way, the brake shoe and anchor pin will rotate in unison about the pivot point defined by the anchor pin to ensure the pin does not bond to the spider.

Accordingly, the above invention provides a smaller anchor pin that rotates within the spider hole in response to manipulation of the brakes shoes.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
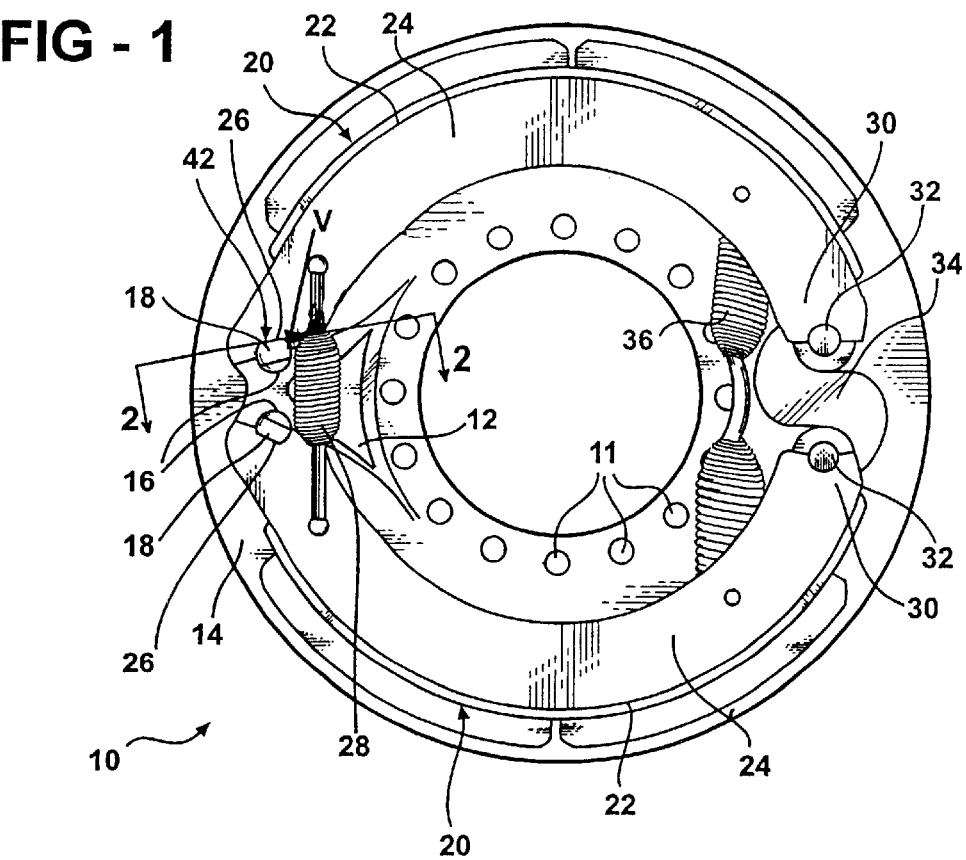
FIG. 1 is a top elevational view of the present invention brake assembly.
Figure 2:
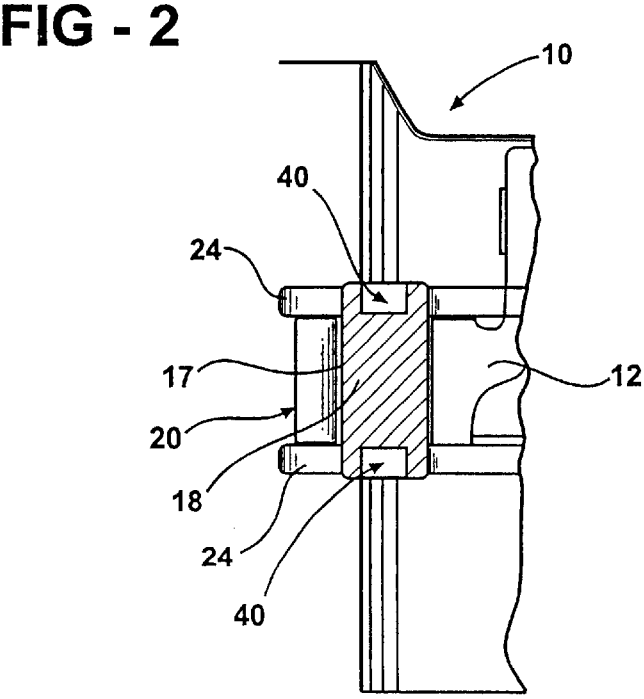
FIG. 2 is a cross-sectional view of the brake shoe and anchor pin taken along line 2—2 of FIG. 1.
Figure 3A:
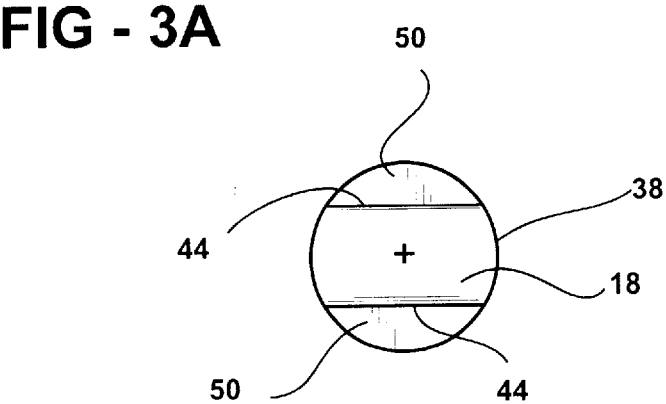
FIG. 3A is an end view of the anchor pin.
Figure 3B:
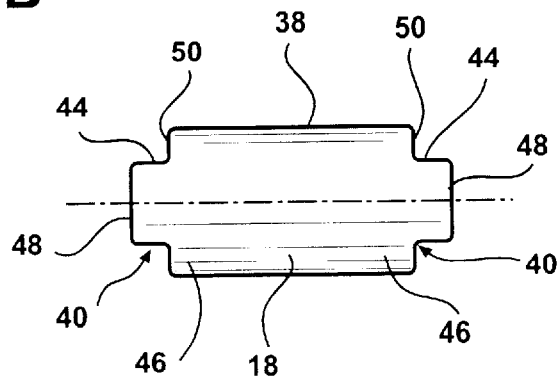
FIG. 3B is a side elevational view of the anchor pin shown in FIG. 3A.
Figure 3C:
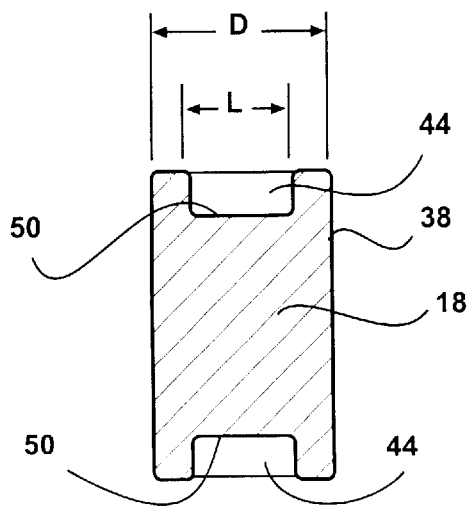
FIG. 3C is a top elevational view of the anchor pin shown in FIG. 3A.

A brake assembly 10 for a heavy duty commercial vehicle is shown in FIG. 1. The brake assembly 10 includes a brake spider 12 having a plurality of holes 11 for receiving fasteners that secure the spider 12 to a brake flange of an axle. The assembly 10 also typically includes dust shields 14 secured to the brake flange to prevent debris from entering the brake assembly. Referring to FIGS. 11 and 2, the spider 12 includes a pair of holes 16 having a bushing 17 pressed in each hole 16. Anchor pins 18 are received within the holes 16 and define pivot points about which the shoes 20 rotate during actuation of the brakes. The brake shoe 20 is supported on each of the anchor pins 18. Specifically, the brake shoes 20 include a brake lining 22 that engages a brake drum during braking. The lining 22 is supported by a pair of spaced apart webs 24 having apertures 26 at one end of the web. The apertures 26 may be notches in the end of the web 24, as shown. A retaining spring 28 is arranged between the brake shoes 20 to retain the shoes 20 on the anchor pins 18. An end 30 of the web 24 opposite the anchor pins 18 are supported by rollers 32 received by an S-cam 34. The S-cam 34 is rotated by a pneumatic cylinder to rotate the shoes 20 about the anchor pins 18 forcing the lining 22 into engagement with the brake drum. A return spring 36 arranged between the brake shoes retracts the shoes 20 from the brake drum when the S-cam 34 is deactuated.

Referring to FIGS. 2 and 3A–3C, the anchor pins 18 have a cylindrical outer surface 38 with a first interlocking profile 40 defined by a recess 44. The recess 44, which may be opposing flats, are arranged on the end portions 46 of the anchor pins 18. The flats 44 are of a length L less then the diameter D of the anchor pin 18. The recesses 44 may extend to the terminal ends 48 of the pin 18. Each end portion 46 is shown with opposing recesses or flats 44. Only one recess is used while the other recess remains unused. Providing a recess 44 on either side of the end portion 46 simplifies assembly of the brake assembly. The cylindrical outer surface 38 of the anchor pin 18 extends to the terminal ends 48 of the pin 18 except for the portions having the recess 44. The recess 44 provides a shoulder 50. The portion of the anchor pin between the shoulders 50 are received in the hole 16 of the spider 12.

The webs 24 are supported on the recesses 44 on either side of the anchor pin 18 by the apertures 26. Te webs 24 are adjacent shoulders 50 and retain the pins 18 within the holes 16. As a result, a large central portion is not needed and a smaller pin and spider may be used. The apertures 26 have a second interlocking profile that is complimentary to the first interlocking profile 40 on the pin 18. For example, for the flat pin recess shown in the Figures, the aperture 26 has a corresponding flat feature engaging the flat on the pin 18. In this manner, the shoe 20 will rotate the pin 18 within the hole 16. That is, the interlocking profiles 40 and 42 rotationally retain the web 24 and pin 18 to one another for rotation in unison about the pivot. Said another way, the interlocking profiles 40 and 42 prevent relative rotation between the web and the end portion 46 of the pin 18. As a result, the shoe 20 positively rotates the anchor pin 18 within the hole 16 of the spider 12 to prevent corrosion of the pin 18 within the spider hole 16 and extends the overall life of the brake assembly 10.

As shown in FIG. 1, actuation of the S-cam 34 generates a load vector V on the anchor pin 18. The end portions 46 carry the load of the load vector V. The load vector V is distributed on the cylindrical outer surface 38. The shoulders 50 created by the recesses 44 eliminate the need for the prior art large central portion.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A vehicle brake assembly comprising:
a support member with a hole; an anchor pin at least partially disposed within said hole and including an end portion extending from said hole, said end portion having an first interlocking profile, wherein said anchor pin includes an outer cylindrical surface with said first interlocking profile defined by at least one recess in said end portion of said outer cylindrical surface;
a brake shoe including a web having an aperture with said end portion at least partially disposed within said aperture, said aperture having a second interlocking profile complementary to and mating with said first interlocking profile preventing relative rotation between said web and said end portion; and
an actuating member supported by said support member engaging an end of said web opposite said aperture, said actuating member generating a load vector on said outer cylindrical surface of said end-portion proximate said recess.

2. The brake assembly according to claim 1, wherein said recess is flat.

3. The brake assembly according to claim 2, said first interlocking profile includes a pair of opposing flat recesses in said outer cylindrical surface.

4. The brake assembly according to claim 2, wherein said flat recess has a length and said anchor pin has a diameter with said length less than said diameter.

5. The brake assembly according to claim 1, wherein said anchor pin includes a terminal end and said recess extends to said terminal end.

6. The brake assembly according to claim 5, wherein said, recess defines a shoulder with said web abutting said shoulder.

7. The brake assembly according to claim 5, wherein a portion of said cylindrical surface extends to said terminal end.

8. The brake assembly according to claim 1, wherein said support member is a brake spider.

9. The brake assembly according to claim 1, further including a bushing disposed within said hole and interposed between said support member and said anchor pin.

10. The brake assembly according to claim 1, wherein said brake shoe includes a pair of spaced apart webs each having said aperture, and said anchor pin includes opposing end portions extending from opposite sides of said hole, each of said end portions interlocking with said apertures respectively.

11. The brake assembly according to claim 1, wherein said outer cylindrical surface has a circumference defining a circumferential length and said recess extends about said circumference less than said circumferential length.

12. A heavy duty brake shoe comprising:
a brake lining; and
a pair of spaced apart webs having adjacent ends each with a notch defining a flat and a pair of opposing arcuate surfaces adjoining said flat for ensuring alignment of a brake load vector with at least one said arcuate surfaces.

* * * * *

UNITED STATES PATENT AND TRADEMARK OFFICE
CERTIFICATE OF CORRECTION

PATENT NO. : 6,648,111 B2
DATED : November 18, 2003
INVENTOR(S) : Catania

It is certified that error appears in the above-identified patent and that said Letters Patent is hereby corrected as shown below:

Column 4,
Line 17, "said, recess" should be -- said recess --

Signed and Sealed this

Thirteenth Day of January, 2004

JON W. DUDAS
*Acting Director of the United States Patent and Trademark Office*